US012662646B2

(12) United States Patent
Cain et al.

(10) Patent No.: US 12,662,646 B2
(45) **Date of Patent: *Jun. 23, 2026**

(54) LUBRICATING FLUID FOR INTERNAL COMBUSTION ENGINES FUELED WITH ALTERNATIVE COMBUSTION FUELS HAVING HIGH AUTO-IGNITION TEMPERATURES

(71) Applicant: Afton Chemical Corporation, Richmond, VA (US)

(72) Inventors: Nathaniel Cain, Richmond, VA (US); Tara Loosmore, Richmond, VA (US); Alisdair Brown, Wantage (GB); Dominic Myers, Reading (GB); Ashutosh Gupta, Henrico, VA (US)

(73) Assignee: Afton Chemical Corporation

( * ) Notice: Subject to any disclaimer, the term of this patent is extended or adjusted under 35 U.S.C. 154(b) by 0 days.

This patent is subject to a terminal disclaimer.

(21) Appl. No.: 18/931,962

(22) Filed: Oct. 30, 2024

(65) Prior Publication Data

US 2026/0117140 A1 Apr. 30, 2026

(51) Int. Cl.
*C10M 135/10* (2006.01)
*C10M 169/04* (2006.01)
(Continued)

(52) U.S. Cl.
CPC ........ *C10M 135/10* (2013.01); *C10M 169/04* (2013.01); *F02B 9/02* (2013.01);
(Continued)

(58) Field of Classification Search
CPC .............. C10M 135/10; C10M 169/04; C10M 2203/003; C10M 2219/044;
(Continued)

(56) References Cited

U.S. PATENT DOCUMENTS 5,362,419 A 11/1994 Zinke et al.
5,578,236 A 11/1996 Srinivasan et al.
(Continued)

FOREIGN PATENT DOCUMENTS

CN 102575186 A 7/2012
CN 117050803 A 11/2023
(Continued)

OTHER PUBLICATIONS

Huanmou et al. "Lubricity of carboxyl acid derivatives of O,O-diakyl-phosphorodithioate" Journal of Hunan University, vol. 23, n 3, (1996), p. 65-70.

(Continued)

*Primary Examiner* — Cephia D Toomer
(74) *Attorney, Agent, or Firm* — Honigman LLP

(57) ABSTRACT

A lubricating oil composition configured for lubricating an internal combustion engine fueled with an alternative fuel having an auto-ignition temperature greater than about 700K. The lubricating oil composition includes at least a detergent system including at least one overbased metal-containing sulfonate detergent, at least one neutral to low-based metal containing sulfonate detergent, and at least one overbased metal-containing phenate detergent where the metal provided from the overbased sulfonate detergent is correctly balanced relative to the total detergent metal and/or the composition total base number.

36 Claims, 1 Drawing Sheet

(51) Int. Cl.

| | |
|---|---|
| ***F02B 9/02*** | (2006.01) |
| ***F02B 43/10*** | (2006.01) |
| *C10N 30/00* | (2006.01) |
| *C10N 30/04* | (2006.01) |
| *C10N 40/25* | (2006.01) |

(52) U.S. Cl.
CPC ....... *F02B 43/10* (2013.01); *C10M 2203/003* (2013.01); *C10M 2219/044* (2013.01); *C10M 2219/046* (2013.01); *C10N 2030/04* (2013.01); *C10N 2030/52* (2020.05); *C10N 2040/25* (2013.01)

(58) Field of Classification Search
CPC ..... C10M 2219/046; F02B 9/02; F02B 43/10; C10N 2030/04; C10N 2030/52; C10N 2040/25
See application file for complete search history.

(56) References Cited

U.S. PATENT DOCUMENTS

| | | | | |
|---|---|---|---|---|
| 5,922,657 | A | 7/1999 | Camenzind et al. | |
| 6,451,745 | B1 | 9/2002 | Ward | |
| 8,163,681 | B2 | 4/2012 | Bardasz et al. | |
| 10,370,615 | B2 | 8/2019 | Carpentier et al. | |
| 10,443,558 | B2 | 10/2019 | Ransom et al. | |
| 10,465,142 | B2 | 11/2019 | Ueda et al. | |
| 11,578,287 | B1 | 2/2023 | Giles et al. | |
| 11,608,478 | B2 | 3/2023 | Mosier et al. | |
| 12,384,980 | B2 | 8/2025 | Gao et al. | |
| 2001/0036906 | A1 | 11/2001 | Locke et al. | |
| 2006/0063685 | A1 | 3/2006 | Purmer et al. | |
| 2006/0264340 | A1 | 11/2006 | Iyer et al. | |
| 2009/0233822 | A1 | 9/2009 | Iyer | |
| 2009/0233823 | A1 | 9/2009 | Fahl et al. | |
| 2011/0160108 | A1 | 6/2011 | Cook et al. | |
| 2012/0214719 | A1 | 8/2012 | Garcia Ojeda | |
| 2013/0008756 | A1 | 1/2013 | Noles, Jr. et al. | |
| 2014/0038866 | A1 | 2/2014 | Barton | |
| 2014/0097059 | A1 | 4/2014 | Tang et al. | |
| 2015/0210953 | A1 | 7/2015 | Davies et al. | |
| 2015/0322368 | A1 | 11/2015 | Patel et al. | |
| 2016/0024417 | A1 | 1/2016 | Kamano | |
| 2016/0032213 | A1 | 2/2016 | Green et al. | |
| 2016/0186084 | A1* | 6/2016 | Schilowitz | C10M 161/00 508/370 |
| 2016/0272915 | A1 | 9/2016 | Mosier | |
| 2017/0204348 | A1 | 7/2017 | Tamura | |
| 2017/0211007 | A1 | 7/2017 | Deckman et al. | |
| 2017/0298287 | A1 | 10/2017 | Tamura | |
| 2018/0066203 | A1 | 3/2018 | Dance et al. | |
| 2018/0119048 | A1 | 5/2018 | Deckman et al. | |
| 2018/0201860 | A1* | 7/2018 | Ransom | F02P 5/02 |
| 2018/0346839 | A1 | 12/2018 | Fletcher et al. | |
| 2025/0197755 | A1 | 6/2025 | Featherstone et al. | |
| 2025/0197761 | A1 | 6/2025 | Featherstone et al. | |
| 2025/0197762 | A1 | 6/2025 | Featherstone et al. | |
| 2025/0197763 | A1 | 6/2025 | Featherstone et al. | |
| 2025/0197764 | A1 | 6/2025 | Featherstone et al. | |
| 2025/0197765 | A1 | 6/2025 | Featherstone et al. | |
| 2025/0263625 | A1 | 8/2025 | De Feo et al. | |

FOREIGN PATENT DOCUMENTS

| | | | |
|---|---|---|---|
| EP | 0225580 | A2 | 6/1987 |
| EP | 0894845 | A1 | 2/1999 |
| EP | 1233054 | A1 | 8/2002 |
| EP | 1262538 | A2 | 12/2002 |
| EP | 0856042 | B1 | 1/2003 |
| EP | 1529831 | A2 | 5/2005 |
| EP | 1661970 | A1 | 5/2006 |
| EP | 2102321 | A1 | 9/2009 |
| EP | 4397738 | A1 | 9/2016 |
| EP | 3415589 | A1 | 12/2018 |
| WO | 9321289 | A1 | 10/1993 |
| WO | 2008079715 | A1 | 7/2008 |
| WO | 2023234294 | A1 | 12/2023 |
| WO | 2025126135 | A1 | 6/2025 |
| WO | 2025126136 | A1 | 6/2025 |
| WO | 2025126139 | A1 | 6/2025 |
| WO | 2025126140 | A1 | 6/2025 |
| WO | 2025126141 | A1 | 6/2025 |
| WO | 2025126142 | A1 | 6/2025 |
| WO | 2025133509 | A1 | 6/2025 |

OTHER PUBLICATIONS

Amann et al. "The Effect of EGR on Low-Speed Pre-Ignition in Boosted SI Engines" SAE International, vol. 4, issue 1, p. 235-245.
Onodera et al., "Engine Oil Formulation Technology to Prevent Pre-ignition in Turbocharged Direct Injection Spark Ignition Engines" SAE International, ISSN 0148-7191.
Hirano et al., "Investigation of Engine Oil Effect on Abnormal Combustion in Turbocharged Direct Injection—Spark Ignition Engines (Part 2)" SAE International, ISSN 0148-7191.
Extended European Search Report for EP 25207645.0, dated Mar. 3, 2026.
Extended European Search Report for EP 25207649.2, dated Apr. 24, 2026.

* cited by examiner

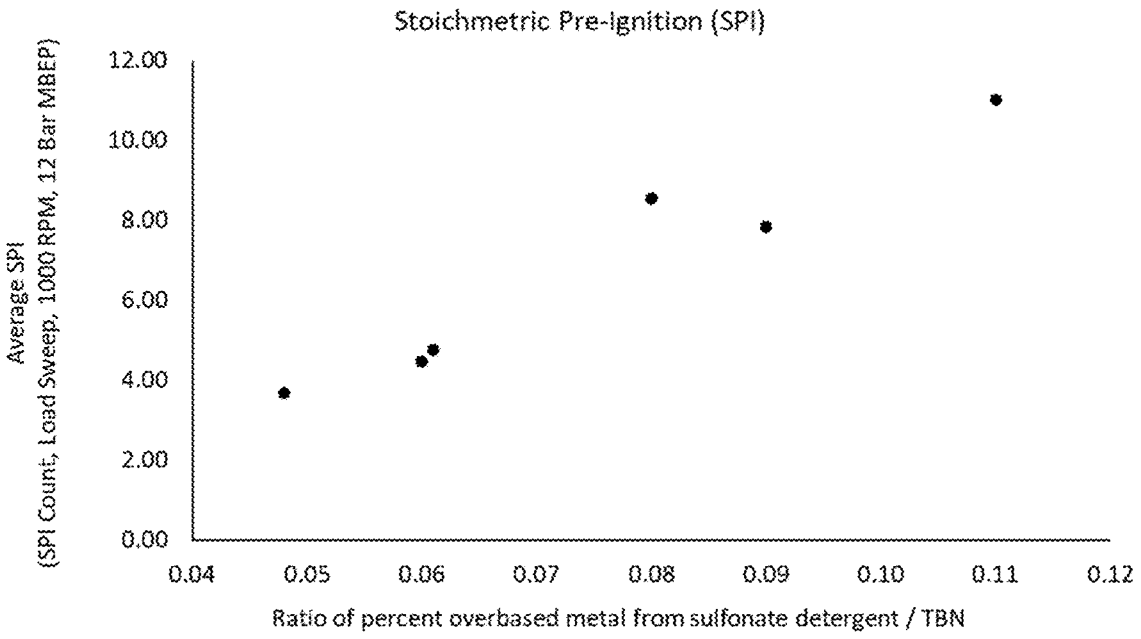
Stoichmetric Pre-Ignition (SPI)
Average SPI
(SPI Count, Load Sweep, 1000 RPM, 12 Bar MBEP)
12.00
10.00
8.00
6.00
4.00
2.00
0.00
0.04
0.05
0.06
0.07
0.08
0.09
0.10
0.11
0.12
Ratio of percent overbased metal from sulfonate detergent / TBN

LUBRICATING FLUID FOR INTERNAL COMBUSTION ENGINES FUELED WITH ALTERNATIVE COMBUSTION FUELS HAVING HIGH AUTO-IGNITION TEMPERATURES

TECHNICAL FIELD

The present disclosure relates to lubricating fluids for internal combustion engines fueled with alternative combustion fuels having high auto-ignition temperatures and methods of lubricating an internal combustion engine using the lubricating fluids when fueled with such alternative combustion fuels.

BACKGROUND

Many engine and vehicle manufacturers are exploring the use of alternative combustion fuels, such as those having high auto-ignition temperatures of about 700K or greater, as an alternative to gasoline or diesel fuels. Such alternative fuels include at least hydrogen fuel, compressed natural gas (CNG), and/or liquid natural gas (LNG). Hydrogen-fueled engines or natural-gas fueled engines have several advantages. For example, existing internal combustion engines can generally be operated using such fuels with little to no modification, which simplifies the implementation due to the ability to utilize a robust and durable engine platform that has a long history and is well understood One challenge in the context of hydrogen-fueled or natural gas-fueled engines, however, is a problem called stochastic pre-ignition (SPI), which tends to be a limiting factor in developing the hydrogen-fueled or natural-gas fueled internal combustion engine for widespread use. SPI in hydrogen-fueled or natural gas-fueled engines is a premature ignition event of the main fuel charge leading to early detonation, misfiring, and/or knock. It is similar to low speed pre-ignition (LSPI) often found in certain turbocharged direct-injection engine gasoline engines, but unfortunately, known solutions to improve LSPI in traditional gasoline-fueled engines do not necessarily translate to improved SPI in hydrogen-fueled or natural gas-fueled engines.

SUMMARY

In one embodiment, a lubricating oil composition configured for lubricating an internal combustion engine fueled with a fuel having an auto-ignition temperature greater than about 700K is described herein. In embodiments, the lubricating oil composition is effective to reduce or minimize stochastic pre-ignition (SPI). The lubricating oil composition includes one or more base oils of lubricating viscosity; a detergent system including (i) at least one overbased metal-containing sulfonate detergent providing about 2 to about 8 mmol of metal to the composition; (ii) at least one neutral to low-based metal containing sulfonate detergent providing at least about 0.02 mmol of metal to the composition; (iii) at least one overbased metal-containing phenate detergent providing up to about 4 mmol of metal to the composition; and wherein the lubricating oil composition has a total base number (TBN), measured pursuant to ASTM D2896, of at least about 9.5.

In other approaches or embodiments, the lubricating oil composition described in the previous paragraph includes other features or embodiments in any combination. These other features or embodiments include one or more of the following: wherein a ratio of the proportion of moles of metal provided from the overbased metal-containing sulfonate detergent relative to the TBN of the lubricating oil composition (ASTM D2896) is about 0.07 or less (or about 0.06 or less); and/or wherein the TBN of the lubricating oil composition is about 10 to about 15 as measured pursuant to ASTM D2896; and/or wherein the lubricating oil composition has greater than 0.9 weight percent of sulfated ash (SASH) content as measured pursuant to ASTM D874; and/or wherein the lubricating oil composition has greater than 1.2 weight percent of sulfated ash (SASH) content as measured pursuant to ASTM D874; and/or wherein the detergent system provides about 1000 to about 5000 ppm of calcium; and/or wherein the detergent system provides about 10 to about 800 ppm of magnesium; and/or wherein the detergent system provides only calcium; and/or wherein the composition further includes one or more oil-soluble molybdenum compounds providing about 200 ppm or less of molybdenum; and/or wherein the detergent system includes at least an overbased metal-containing sulfonate detergent, at least an overbased metal-containing phenate detergent, or a combination thereof and wherein each overbased detergent has a TBN of at least about 200 (ASTM D2896); and/or wherein the one or more base oils of lubricating viscosity include API Group I base oils, API Group II base oils, or combinations thereof; and/or wherein the composition is configured for lubricating an internal combustion engine fueled with a fuel having an auto-ignition temperature greater than about 800K; and/or wherein the composition is configured for lubricating an internal combustion engine fueled with a fuel having an auto-ignition temperature greater than about 850K; and/or wherein the lubricating oil composition has an average measured stochastic pre-ignition (SPI) of about 6 SPI counts or less at 1000 rpm and 12 bar brake mean effective pressure (BMEP); and/or wherein the fuel having an auto-ignition temperature greater than about 700K is hydrogen fuel.

In yet other approaches or embodiments, the present disclosure also provides a method of lubricating an internal combustion engine when fueled with a fuel having an auto-ignition temperature greater than about 700K to mitigate abnormal combustion events. In aspect, the method includes lubricating a crankcase of an internal combustion engine with any embodiment of the lubricating oil composition of this Summary and combusting a fuel having an auto-ignition temperature greater than about 700K in the internal combustion engine; and, in other embodiments, the lubricating oil composition includes (i) one or more base oils of lubricating viscosity and (ii) a detergent system including (iia) at least one overbased metal-containing sulfonate detergent providing about 2 to about 8 mmol of metal to the composition; (iib) at least one neutral to low-based metal containing sulfonate detergent providing at least about 0.02 mmol of metal to the composition; (iic) at least one overbased metal-containing phenate detergent providing up to about 4 mmol of metal to the composition; and wherein the lubricating oil composition has a total base number (TBN), measured pursuant to ASTM D2896, of at least about 9.5.

In other embodiments, the method of the previous paragraph further includes other features, method steps, or embodiments in any combination. These other features, steps, or embodiments include one or more of the following: wherein a ratio of the proportion of moles of metal provided from the overbased metal-containing sulfonate detergent relative to the TBN of the lubricating oil composition (ASTM D2896) is about 0.07 or less (or about 0.06 or less); and/or wherein the TBN of the lubricating oil composition is about 10 to about 15 as measured pursuant to ASTM D2896; and/or wherein the lubricating oil composition has greater than 0.9 weight percent of sulfated ash (SASH) content as measured pursuant to ASTM D874; and/or wherein the lubricating oil composition has greater than 1.2 weight percent of sulfated ash (SASH) content as measured pursuant to ASTM D874; and/or wherein the detergent system provides about 1000 to about 5000 ppm of calcium; and/or wherein the detergent system provides about 10 to about 800 ppm of magnesium; and/or wherein the detergent system provides only calcium metal; and/or wherein the composition further includes one or more oil-soluble molybdenum compounds providing about 200 ppm or less of molybdenum; and/or wherein the detergent system includes at least an overbased metal-containing sulfonate detergent, at least an overbased metal-containing phenate detergent, or a combination thereof and wherein each overbased detergent has a TBN of at least about 200 (ASTM D2896); and/or wherein the one or more base oils of lubricating viscosity include API Group I base oils, API Group II base oils, or combinations thereof; and/or wherein the composition is configured for lubricating an internal combustion engine fueled with a fuel having an auto-ignition temperature greater than about 800K; and/or wherein the composition is configured for lubricating an internal combustion engine fueled with a fuel having an auto-ignition temperature greater than about 850K; and/or wherein the fuel having an auto-ignition temperature greater than about 700K is hydrogen fuel, compressed natural gas, or liquid natural gas; and/or wherein the lubricating oil composition has an average measured stochastic pre-ignition (SPI) of about 6 SPI counts or less at 1000 rpm and 12 bar brake mean effective pressure (BMEP).

In yet further embodiments or approaches, the present disclosure also describes an internal combustion engine configured for combustion of hydrogen fuel and wherein the internal combustion engine includes an engine crankcase lubricated with any embodiment of a lubricating oil composition as described in this summary, and in other embodiments, the lubricating oil composition includes (i) one or more base oils of lubricating viscosity and (ii) a detergent system including (iia) at least one overbased metal-containing sulfonate detergent providing about 2 to about 8 mmol of metal to the composition; (iib) at least one neutral to low-based metal containing sulfonate detergent providing at least about 0.02 mmol of metal to the composition; (iic) at least one overbased metal-containing phenate detergent providing up to about 4 mmol of metal to the composition; and wherein the lubricating oil composition has a total base number (TBN), measured pursuant to ASTM D2896, of at least about 9.5; and wherein the engine is fueled with hydrogen fuel.

In yet other embodiments or approaches, the internal combustion engine of the previous paragraph includes other features or embodiments in any combination. These other features or embodiments include one or more of the following: wherein a ratio of the proportion of moles of metal provided from the overbased metal-containing sulfonate detergent relative to the TBN of the lubricating oil composition (ASTM D2896) is about 0.07 or less (or about 0.06 or less); and/or wherein the TBN of the lubricating oil composition is about 10 to about 15 as measured pursuant to ASTM D2896; and/or wherein the lubricating oil composition has greater than 0.9 weight percent of sulfated ash (SASH) content as measured pursuant to ASTM D874; and/or wherein the lubricating oil composition has greater than 1.2 weight percent of sulfated ash (SASH) content as measured pursuant to ASTM D874; and/or wherein the detergent system provides about 1000 to about 5000 ppm of calcium; and/or wherein the detergent system provides about 10 to about 800 ppm of magnesium; and/or wherein the detergent system provides only calcium metal; and/or wherein the composition further includes one or more oil-soluble molybdenum compounds providing about 200 ppm or less of molybdenum; and/or wherein the detergent system includes at least an overbased metal-containing sulfonate detergent, at least an overbased metal-containing phenate detergent, or a combination thereof and wherein each overbased detergent has a TBN of at least about 200 (ASTM D2896); and/or wherein the one or more base oils of lubricating viscosity include API Group I base oils, API Group II base oils, or combinations thereof; and/or wherein the lubricating oil composition has an average measured stochastic pre-ignition (SPI) of about 6 SPI counts or less at 1000 rpm and 12 bar brake mean effective pressure (BMEP).

In yet other embodiments, the use of any embodiment of the lubricating oil compositions as described in this summary is also provided herein for achieving an average measured stochastic pre-ignition (SPI) of about 6 SPI counts or less at 1000 rpm and 12 bar brake mean effective pressure (BMEP) when used in an internal combustion engine fueled with a fuel having an auto-ignition temperature greater than about 700K, a fuel having an auto-ignition temperature greater than about 800K, or a fuel having an auto-ignition temperature greater than about 850K; and/or wherein the fuel having an auto-ignition temperature greater than about 700K is hydrogen fuel, compressed natural gas, or liquid natural gas.

Other embodiments of the present disclosure will be apparent to those skilled in the art from consideration of the specification and practice of the invention disclosed herein.

BRIEF DESCRIPTION OF DRAWING FIGURE

FIG. 1 is a graph of stochastic pre-ignition (SPI) relative to a ratio of percent metal from overbased sulfonate detergent relative to the lubricant's total base number measured per ASTM D2896.

DETAILED DESCRIPTION

Stochastic pre-ignition (SPI) is a limiting factor in widespread use of alternative combustion fuels (as considered herein, fuels having an auto-ignition temperature of at least about 700K) in internal combustion engines. While SPI is a phenomenon that tends to be similar to low speed pre-ignition (LSPI) in gasoline engines that is sometimes confronted in certain turbocharged direct-injection engine gasoline engines, solutions to address LSPI in gasoline engines do not necessarily improve SPI in, for instance, hydrogen-fueled or natural gas-fueled internal combustion engines. While LSPI can be mitigated by optimizing the impact of calcium in the engine's lubricant, this solution has little to no impact on improving SPI events in hydrogen-fueled engines or natural gas-fueled internal combustion engines. Thus, conventional gasoline engine oils cannot necessarily be used in engines operated with the alternative combustion fuels, such as hydrogen-fueled engines or natural gas-fueled internal combustion engines.

According to exemplary embodiments herein, lubricating oil compositions are provided herein and that are configured for use in or for methods of lubricating an internal combustion engine fueled with an alternative fuel having an auto-ignition temperature of at least about 700K (preferably, fuels having an auto-ignition temperature of 850K or above, and most preferably, hydrogen fuel). The lubricating oil compositions herein are effective to reduce SPI in engines fueled with the alternative fuels. In one aspect or embodiment, the lubricating oil compositions include one or more base oils of lubricating viscosity; a select detergent system including (i) at least one overbased metal-containing sulfonate detergent providing a certain amount of metal to the lubricating composition, (ii) optionally at least one low-based and/or neutral metal containing sulfonate detergent providing an amount of metal to the composition, and (iii) at least one overbased metal-containing phenate detergent providing an amount of metal to the composition; and wherein the lubricating composition has a total base number (TBN), measured pursuant to ASTM D2896, of at least about 9.5. As shown in the Examples below, the detergent metal amounts from each of these detergent sources, when balanced correctly, aid in reducing SPI. In other aspects or embodiments, the lubricating compositions herein may also have a select relationship or ratio of the proportion of moles of overbased metal from the overbased sulfonate detergent relative to total detergent metal and also relative to the TBN (ASTM D2896) where such ratio is about 0.07 or less (or about 0.06 or less). As also shown in the Examples below, this discovered ratio, in some embodiments, may also aid in reducing SPI.

Higher levels of metals (such as calcium) from overbased containing sulfonate detergents tends to negatively impact SPI in the context of hydrogen-fueled engines or natural gas-fueled engines. However, in one embodiment, careful balancing of metal amounts from the overbased metal-containing sulfonate detergent with metal amounts from an overbased metal-containing phenate detergent and/or metal amounts from a low-based or neutral metal-containing sulfonate detergent and/or, in other embodiments, careful balancing of a relationship of the percent metal from overbased sulfonate detergents relative to the total detergent metal and/or also relative to the TBN (ASTM D2896) of the finished fluid has been discovered to mitigate SPI in internal combustion engines fueled with the alternative combustion fuels noted herein having an auto-ignition temperature of at least about 700K. As shown by the Examples, lubricating oil compositions having the described detergent systems herein achieve reduced average SPI when the engine is fueled with the alternative fuels having the auto-ignition temperature of at least about 700K and, in particular, hydrogen fuel, compressed natural gas fuel, and/or liquid natural gas fuel, and most preferably hydrogen fuels such as gaseous hydrogen fuels.

Detergent System

The detergent systems of the lubricating oil compositions herein include one or more metal-containing detergents, preferably one or more overbased metal-containing sulfonate detergents, optionally one or more overbased metal-containing phenate detergents, and/or optionally one or more neutral to low-based to neutral metal-containing sulfonate detergents. In one embodiment, the one or more metal-containing detergents include one or more overbased sulfonate detergents, one or more overbased phenate detergents, and one or more neutral to low-based or neutral sulfonate detergents. In some embodiments, overbased detergents herein have a total base number (TBN) of at least about 200 (preferably about 240 to about 450 or about 250 to about 420) measured by ASTM D2896, and neutral to low-based or neutral detergents have a total base number (TBN) of 50 or below as measured by ASTM D2896. Suitable detergents and their methods of preparation are described, for instance, in greater detail in numerous patent publications, including U.S. Pat. Nos. 7,732,390; 4,165,291, and/or 4,206,062 (and references cited therein), which are incorporated herein by reference.

In embodiments, suitable detergent substrates (e.g., sulfonates or phenates) may be salted with an alkali or alkaline earth metal, which are preferably calcium and/or magnesium, and most preferably, calcium. In approaches or embodiments, the detergent systems herein preferably include (i) at least one overbased metal-containing sulfonate detergent providing about 2 to about 8 mmol of metal to the composition (preferably, about 2.5 to about 7.5 mmol of metal and, more preferably, the metal is calcium and/or magnesium, and most preferably, calcium); (ii) at least one neutral to low-based to neutral metal containing sulfonate detergent providing at least about 0.02 mmol of metal to the composition (preferably, about 0.025 to about 0.2 mmol of metal and, more preferably, the metal is calcium and/or magnesium, and most preferably, calcium); and (iii) at least one overbased metal-containing phenate detergent providing up to about 4 mmol of metal to the composition (preferably, about 2 to about 3.5 mmol of metal and, more preferably, the metal is calcium and/or magnesium, and most preferably, the metal is calcium) and wherein the composition has a total base number (TBN), measured pursuant to ASTM D2896, of at least about 9.5 (and preferably, about 10 to about to about 15, and most preferably, about 10 to about 12). In other embodiments, the detergent systems herein provide about 1000 to about 5000 ppm of calcium; and/or about 10 to about 800 ppm of magnesium.

In embodiments and subject to the discussions on the detergent systems herein, suitable detergents may include linear or branched alkali or alkaline earth metal salts, such as calcium, sodium, or magnesium salts, of petroleum sulfonic acids and long chain mono- or di-alkylaryl sulfonic acids with the aryl group being benzyl, tolyl, and xylyl and/or various phenates or derivatives of phenates. Examples of suitable detergents include (subject to the noted TBN and metal limitations discussed herein), but are not limited to, low-based, neutral, and/or overbased variations of the following detergents: calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols, magnesium phenates, magnesium sulfur containing phenates, magnesium sulfonates, magnesium calixarates, magnesium salixarates, magnesium salicylates, magnesium carboxylic acids, magnesium phosphorus acids, magnesium mono- and/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols. Preferably, the detergent systems herein include at least overbased calcium and/or magnesium sulfonate detergents, overbased calcium and/or magnesium phenate detergents providing the metal amounts noted above.

Overbased metal-containing sulfonate and phenate detergents as well as optional low-based to neutral metal containing sulfonate detergents are well known in the art and generally include alkali or alkaline earth metal overbased detergent additives. Such detergent additives may be prepared by reacting a metal oxide or metal hydroxide with a substrate and carbon dioxide gas. The substrate is typically an acid, for example in the context of the lubricants herein, an acid such as an aliphatic substituted sulfonic acid, or an aliphatic substituted phenol.

The terminology "overbased" relates to metal salts, such as metal salts of sulfonates for the fluids herein, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids. As used herein, an overbased detergent herein may have, in one embodiment, a total base number (TBN) of about 200 mg KOH/gram or higher, about 240 mg KOH/gram or greater, about 250 mg KOH/gram or greater, about 280 mg KOH/gram or greater, or about 300 mg KOH/gram or greater. As used herein, total base number or TBN of a detergent additive is determined using ASTM D2896. When such detergent compositions are formed in an inert diluent, e.g. a process oil, usually a mineral oil, the total base number reflects the basicity of the overall composition including diluent, and any other materials (e.g., promoter, etc.) that may be contained in the detergent composition.

Examples of suitable overbased detergents include (subject to the TBN and metal limitations noted herein), but are not limited to, overbased calcium phenates, overbased calcium and sulfur containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, overbased calcium methylene bridged phenols, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

In some embodiments, the detergent systems used in the lubricants herein includes an overbased calcium sulfonate, an overbased magnesium sulfonate, or combinations thereof with each overbased detergent having a total base number (TBN) of 200 to 450 and, in other approaches, about 200 to about 425 or about 250 to about 425, or about 280 to about 425 (ASTM D2896). In other embodiments, the detergent systems herein may also include overbased calcium phenate, overbased magnesium phenate, or combination thereof with each having a total base number of 200 to 450 and, in other approaches, about 200 to about 400, or about 225 to about 350, or about 240 to about 300 (ASTM D2896). In yet other embodiments, the detergent systems herein may also include low-based to neutral calcium sulfonate, low-based to neutral magnesium sulfonate, or combination thereof with each having a total base number of 50 or less and, in other approaches, about 0 to about 50, or about 0 to about 40, or about 0 to about 30 (ASTM D2896). The above described TBN values reflect those of finished detergent components that have been diluted in a base oil.

Without wishing to be limited by theory, lubricants with higher levels of overbased sulfonate detergents tend to exhibit higher levels of undesired SPI events when used to lubricate engines operating with the alternative combustion fuels described herein (e.g., fuels having an auto-ignition temperature of at least about 700K (e.g., hydrogen or natural gas fuels)). However, when the metal provided by the overbased sulfonate detergent content is correctly balanced relative to the total detergent metals and/or when the percent metal from the overbased sulfonate detergent is balanced relative to the lubricant TBN (ASTM D2896), acceptable levels of SPI can be achieved. As shown in FIG. 1 and the Examples below, for instance, when a ratio of the proportion of moles of metal from the overbased sulfonate detergent to the TBN of the lubricant (ASTM D2896) is about 0.07 or less, and in other embodiments, about 0.06 or less, about 0.055 or less, or about 0.01 to about 0.07, about 0.01 to about 0.06, or about 0.02 to about 0.055 (or any other ranges between the noted endpoints), then average SPI events are less than 6 average SPI events per 1000 cycles, and, in other embodiments, 2 to 6 average SPI events per 1000 cycles. As explained in the Example section below, SPI can be evaluated at FEV Europe GmbH or other suitable testing facility using, for instance, a 6-cylinder engine modified (as needed) to operate using the alternative fuels (e.g. those with an auto-ignition temperature of at least 700 K such as hydrogen fuel, compressed natural gas fuel, or liquid natural gas fuel) at 1000 rpm and 12 bar brake mean effective pressure (BMEP). As shown in FIG. 1 and the Examples, when the proportion of moles of metal provided from the overbased sulfonate detergent (e.g., mmol metal from overbased sulfonate detergent divided by total mmol of metal from detergent) is too high relative to the detergent's TBN, then the SPI events increase to undesirable levels (which is generally an average SPI events of 6 or above).

Lubricating Oil Compositions

The lubricating oil compositions herein include the above described detergent systems and other additives suitable for lubricating internal combustion engines when using the alternative combustion fuels having the noted auto-ignition temperatures. In one approach, the total base number of the lubricating compositions herein, as measured pursuant to ASTM D2896, is at least about 9.5, in other embodiments, about 10 to about 15, and in yet further embodiments, about 10 to about 12. As noted above, this TBN may be balanced relative to the percent metal provided from the overbased sulfonate detergents to mitigate SPI with desirable ratios being about 0.07 or less (or other ratios as noted herein) as shown in the Examples.

The lubricating oil compositions herein can also provide, in some embodiments, a higher level of sulfated ash content, as measured by ASTM D874. For instance and in embodiments, the lubricating oil compositions herein have greater than about 0.9 weight percent of sulfated ash (SASH), greater than about 1.0 weight percent of sulfated ash (SASH), greater than about 1.1 weight percent, greater than about 1.2 weight percent, greater than about 1.3 weight percent, greater than about 1.4 weight percent, or greater than about 1.5 weight percent of sulfated ash (SASH). In other embodiments, the lubricating oil compositions herein have sulfated ash (SASH) contents up to about 1.0 weight percent, or up to about 1.6 weight percent, or about 1.0 weight percent to about 1.6 weight percent as measured by ASTM D874 or about 1.2 weight percent to about 1.6 weight percent as measured by ASTM D874.

Base Oil:

The lubricating fluids herein include one or more base oils having a lubricating viscosity. Base oils suitable for use in formulating the lubricating oil compositions here for use in lubricating an internal combustion engine fueled with the alternative fuels as described herein may be selected from any of suitable synthetic or natural oils or mixtures thereof having a suitable lubricating viscosity. Natural oils may include animal oils and vegetable oils (e.g., castor oil, lard oil) as well as mineral oils such as liquid petroleum oils and solvent treated or acid-treated mineral lubricating oils of the paraffinic, naphthenic or mixed paraffinic-naphthenic types. Oils derived from coal or shale may also be suitable. Further, oil derived from a gas-to-liquid process is also suitable. The base oil may have a kinematic viscosity at 100° C. (e.g. kV100) of about 2 to about 15 cSt, as measured by ASTM D2270-10.

The base oil as used in the invention described herein may be a single base oil or may be a mixture of two or more base oils. In one embodiment, the one or more base oil(s) may be selected from any of the base oils in Groups I to IV as specified in the American Petroleum Institute (API) Base Oil Interchangeability Guidelines. In other embodiments, the one or more base oils of lubricating viscosity preferably include only API Group I base oils, API Group II base oils, or combinations thereof. Such base oil groups are shown in Table 1 as follows:

TABLE 1

| Base oil Category | Sulfur (%) | | Saturates (%) | Viscosity Index |
|---|---|---|---|---|
| API Group I | >0.03 | and/or | <90 | 80 to 120 |
| API Group II | ≤0.03 | and | ≥90 | 80 to 120 |
| API Group III | ≤0.03 | and | ≥90 | ≥120 |
| API Group IV | All polyalphaolefins (PAOs) | | | |
| API Group V | All others not included in Groups I, II, III, or IV | | | |

API Group III base oils may include oil derived from Fischer-Tropsch synthesized hydrocarbons. Fischer-Tropsch synthesized hydrocarbons are made from synthesis gas containing $H_2$ and CO using a Fischer-Tropsch catalyst. Such hydrocarbons typically require further processing in order to be useful as the base oil. These types of oils are commonly referred to as gas-to-liquids (GTLs). For example, the hydrocarbons may be hydroisomerized using processes disclosed in U.S. Pat. No. 6,103,099 or 6,180,575; hydrocracked and hydroisomerized using processes disclosed in U.S. Pat. No. 4,943,672 or 6,096,940; dewaxed using processes disclosed in U.S. Pat. No. 5,882,505; or hydroisomerized and dewaxed using processes disclosed in U.S. Pat. Nos. 6,013,171; 6,080,301; or 6,165,949.

API Group IV base oils, PAOs, are typically derived from monomers having from 4 to 30, or from 4 to 20, or from 6 to 16 carbon atoms. Examples of PAOs that may be used in the present invention include those derived from octene, decene, mixtures thereof, and the like. PAOs may have a kinematic viscosity of from 2 to 15, or from 3 to 12, or from 4 to 8 cSt at 100° C., as measured by ASTM D2270-10. Examples of PAOs include 4 cSt at 100° C. PAOs, 6 cSt at 100° C. PAOs, and mixtures thereof.

The base oil(s) are combined with an additive composition as disclosed in embodiments herein to provide a lubricating oil composition for lubricating the crankcase of an internal combustion engine fueled with a gaseous fuel having an auto-ignition temperature greater than about 700K. Accordingly, the base oil may be present in the lubricating oil composition in an amount greater than about 80 wt % based on the total weight of the lubricating oil composition. In some embodiments, the base oil may be present in the lubricating oil composition in an amount greater than about 85 wt % based on the total weight of the lubricating oil composition.

Alternative Combustion Fuels

The lubricating oil compositions herein are configured for lubricating the crankcase of an internal combustion engine being fueled with an alternative combustion fuel, which for purposes of this disclosure is a fuel having an auto-ignition temperature of at least about 700K, at least about 800K, or at least about 850K. In other approaches, the alternative combustion fuels have auto-ignition temperatures of up to about 900K, up to about 880K, or up to about 860K. Such alternative combustion fuels include, but are not limited to, hydrogen fuel (auto-ignition temperature of about 858K) that can be gaseous hydrogen fuel, natural gas fuel (auto-ignition temperature of about 813K) that can be compressed natural gas and/or liquid natural gas, and the like. Preferably, the alternative combustion fuels herein that are suited for use with the lubricating compositions herein include gaseous hydrogen fuel that is combusted in the engine in a gaseous state.

Other Additives

The lubricating oil compositions described herein may also include other additives of the type used in crankcase lubricating compositions in addition to the components described above. Such additives include, but are not limited to, antioxidant(s), viscosity modifier(s), phosphorus-containing components, detergent(s), corrosion inhibitor(s), antirust additives, antifoam agent(s), demulsifier(s), pour point depressant(s), seal swell agent(s), and additional dispersant(s), additional friction modifier(s), and additional sulfur-containing component(s).

DISPERSANTS: The lubricating oil composition may optionally include one or more dispersants or mixtures thereof. Dispersants are often known as ashless-type dispersants because, prior to mixing in a lubricating oil composition, they do not contain ash-forming metals and they do not normally contribute any ash when added to a lubricant. Ashless type dispersants are characterized by a polar group attached to a relatively high molecular weight hydrocarbon chain. Typical ashless dispersants include N-substituted long chain alkenyl succinimides. Examples of N-substituted long chain alkenyl succinimides include polyisobutylene succinimide with the number average molecular weight of the polyisobutylene substituent being in the range about 350 to about 50,000, or to about 5,000, or to about 3,000, as measured by GPC. Succinimide dispersants and their preparation are disclosed, for instance in U.S. Pat. No. 7,897,696 or U.S. Pat. No. 4,234,435. The alkenyl substituent may be prepared from polymerizable monomers containing about 2 to about 16, or about 2 to about 8, or about 2 to about 6 carbon atoms. Succinimide dispersants are typically the imide formed from a polyamine, typically a poly(ethyleneamine).

Preferred amines are selected from polyamines and hydroxyamines. Examples of polyamines that may be used include, but are not limited to, diethylene triamine (DETA), triethylene tetramine (TETA), tetraethylene pentamine (TEPA), and higher homologues such as pentaethylamine hexamine (PEHA), and the like.

A suitable heavy polyamine is a mixture of polyalkylenepolyamines comprising small amounts of lower polyamine oligomers such as TEPA and PEHA (pentaethylene hexamine) but primarily oligomers with 6 or more nitrogen atoms, 2 or more primary amines per molecule, and more extensive branching than conventional polyamine mixtures. A heavy polyamine preferably includes polyamine oligomers containing 7 or more nitrogens per molecule and with 2 or more primary amines per molecule. The heavy polyamine comprises more than 28 wt. % (e.g. >32 wt. %) total nitrogen and an equivalent weight of primary amine groups of 120-160 grams per equivalent.

In some approaches, suitable polyamines are commonly known as PAM and contain a mixture of ethylene amines where TEPA and pentaethylene hexamine (PEHA) are the major part of the polyamine, usually less than about 80%.

Typically, PAM has 8.7 to 8.9 milliequivalents of primary amine per gram (an equivalent weight of 115 to 112 grams per equivalent of primary amine) and a total nitrogen content of about 33-34 wt. %. Heavier cuts of PAM oligomers with practically no TEPA and only very small amounts of PEHA but containing primarily oligomers with more than 6 nitrogens and more extensive branching, may produce dispersants with improved dispersancy.

In an embodiment the present disclosure further comprises at least one polyisobutylene succinimide dispersant derived from polyisobutylene with a number average molecular weight in the range about 350 to about 50,000, or to about 5000, or to about 3000, as determined by GPC. The polyisobutylene succinimide may be used alone or in combination with other dispersants.

In some embodiments, polyisobutylene, when included, may have greater than 50 mol %, greater than 60 mol %, greater than 70 mol %, greater than 80 mol %, or greater than 90 mol % content of terminal double bonds. Such PIB is also referred to as highly reactive PIB ("HR-PIB"). HR-PIB having a number average molecular weight ranging from about 800 to about 5000, as determined by GPC, is suitable for use in embodiments of the present disclosure. Conventional PIB typically has less than 50 mol %, less than 40 mol %, less than 30 mol %, less than 20 mol %, or less than 10 mol % content of terminal double bonds.

An HR-PIB having a number average molecular weight ranging from about 900 to about 3000 may be suitable, as determined by GPC. Such HR-PIB is commercially available, or can be synthesized by the polymerization of isobutene in the presence of a non-chlorinated catalyst such as boron trifluoride, as described in U.S. Pat. No. 4,152,499 to Boerzel, et al. and U.S. Pat. No. 5,739,355 to Gateau, et al. When used in the aforementioned thermal ene reaction, HR-PIB may lead to higher conversion rates in the reaction, as well as lower amounts of sediment formation, due to increased reactivity. A suitable method is described in U.S. Pat. No. 7,897,696.

In one embodiment, the present disclosure further comprises at least one dispersant derived from polyisobutylene succinic anhydride ("PIBSA"). The PIBSA may have an average of between about 1.0 and about 2.0 succinic acid moieties per polymer. The % actives of the alkenyl or alkyl succinic anhydride can be determined using a chromatographic technique. This method is described in column 5 and 6 in U.S. Pat. No. 5,334,321. The percent conversion of the polyolefin is calculated from the % actives using the equation in column 5 and 6 in U.S. Pat. No. 5,334,321. Unless stated otherwise, all percentages are in weight percent and all molecular weights are number average molecular weights determined by gel permeation chromatography (GPC) using commercially available polystyrene standards (with a number average molecular weight of 180 to about 18,000 as the calibration reference).

In one embodiment, the dispersant may be derived from a polyalphaolefin (PAO) succinic anhydride. In one embodiment, the dispersant may be derived from olefin maleic anhydride copolymer. As an example, the dispersant may be described as a poly-PIBSA. In an embodiment, the dispersant may be derived from an anhydride which is grafted to an ethylene-propylene copolymer.

A suitable class of nitrogen-containing dispersants may be derived from olefin copolymers (OCP), more specifically, ethylene-propylene dispersants which may be grafted with maleic anhydride. A more complete list of nitrogen-containing compounds that can be reacted with the functionalized OCP are described in U.S. Pat. Nos. 7,485,603; 7,786,057; 7,253,231; 6,107,257; and 5,075,383; and/or are commercially available.

One class of suitable dispersants may also be Mannich bases. Mannich bases are materials that are formed by the condensation of a higher molecular weight, alkyl substituted phenol, a polyalkylene polyamine, and an aldehyde such as formaldehyde. Mannich bases are described in more detail in U.S. Pat. No. 3,634,515.

A suitable class of dispersants may also be high molecular weight esters or half ester amides. A suitable dispersant may also be post-treated by conventional methods by a reaction with any of a variety of agents. Among these are boron, urea, thiourea, dimercaptothiadiazoles, carbon disulfide, aldehydes, ketones, carboxylic acids, hydrocarbon-substituted succinic anhydrides, maleic anhydride, nitriles, epoxides, carbonates, cyclic carbonates, hindered phenolic esters, and phosphorus compounds. U.S. Pat. Nos. 7,645,726; 7,214,649; and 8,048,831 are incorporated herein by reference in their entireties.

In addition to the carbonate and boric acids post-treatments both the compounds may be post-treated, or further post-treatment, with a variety of post-treatments designed to improve or impart different properties. Such post-treatments include those summarized in columns 27-29 of U.S. Pat. No. 5,241,003, hereby incorporated by reference. Such treatments include, treatment with: Inorganic phosphorous acids or anhydrates (e.g., U.S. Pat. Nos. 3,403,102 and 4,648,980); Organic phosphorous compounds (e.g., U.S. Pat. No. 3,502,677); Phosphorous pentasulfides; Boron compounds as already noted above (e.g., U.S. Pat. Nos. 3,178,663 and 4,652,387); Carboxylic acid, polycarboxylic acids, anhydrides and/or acid halides (e.g., U.S. Pat. Nos. 3,708,522 and 4,948,386); Epoxides polyepoxiates or thioexpoxides (e.g., U.S. Pat. Nos. 3,859,318 and 5,026,495); Aldehyde or ketone (e.g., U.S. Pat. No. 3,458,530); Carbon disulfide (e.g., U.S. Pat. No. 3,256,185); Glycidol (e.g., U.S. Pat. No. 4,617,137); Urea, thiourea or guanidine (e.g., U.S. Pat. Nos. 3,312,619; 3,865,813; and British Patent GB 1,065,595);

Organic sulfonic acid (e.g., U.S. Pat. No. 3,189,544 and British Patent GB 2,140,811); Alkenyl cyanide (e.g., U.S. Pat. Nos. 3,278,550 and 3,366,569); Diketene (e.g., U.S. Pat. No. 3,546,243); A diisocyanate (e.g., U.S. Pat. No. 3,573,205); Alkane sultone (e.g., U.S. Pat. No. 3,749,695); 1,3-Dicarbonyl Compound (e.g., U.S. Pat. No. 4,579,675); Sulfate of alkoxylated alcohol or phenol (e.g., U.S. Pat. No. 3,954,639); Cyclic lactone (e.g., U.S. Pat. Nos. 4,617,138; 4,645,515; 4,668,246; 4,963,275; and 4,971,711); Cyclic carbonate or thiocarbonate linear monocarbonate or polycarbonate, or chloroformate (e.g., U.S. Pat. Nos. 4,612,132; 4,647,390; 4,648,886; 4,670,170); Nitrogen-containing carboxylic acid (e.g., U.S. Pat. No. 4,971,598 and British Patent GB 2,140,811); Hydroxy-protected chlorodicarbonyloxy compound (e.g., U.S. Pat. No. 4,614,522); Lactam, thiolactam, thiolactone or dithiolactone (e.g., U.S. Pat. Nos. 4,614,603 and 4,666,460); Cyclic carbonate or thiocarbonate, linear monocarbonate or polycarbonate, or chloroformate (e.g., U.S. Pat. Nos. 4,612,132; 4,647,390; 4,646,860; and 4,670,170); Nitrogen-containing carboxylic acid (e.g., U.S. Pat. No. 4,971,598 and British Patent GB 2,440,811); Hydroxy-protected chlorodicarbonyloxy compound (e.g., U.S. Pat. No. 4,614,522); Lactam, thiolactam, thiolactone or dithiolactone (e.g., U.S. Pat. Nos. 4,614,603, and 4,666,460); Cyclic carbamate, cyclic thiocarbamate or cyclic dithiocarbamate (e.g., U.S. Pat. Nos. 4,663,062 and 4,666,459); Hydroxyaliphatic carboxylic acid (e.g., U.S. Pat. Nos. 4,482,464; 4,521,318; 4,713,189); Oxidizing agent (e.g., U.S. Pat. No. 4,379,064); Combination of phosphorus pentasulfide and a polyalkylene polyamine (e.g., U.S. Pat. No. 3,185,647); Combination of carboxylic acid or an aldehyde or ketone and sulfur or sulfur chloride (e.g., U.S. Pat. Nos. 3,390,086; 3,470,098); Combination of a hydrazine and carbon disulfide (e.g. U.S. Pat. No. 3,519,564); Combination of an aldehyde and a phenol (e.g., U.S. Pat. Nos. 3,649,229; 5,030,249; 5,039,307); Combination of an aldehyde and an O-diester of dithiophosphoric acid (e.g., U.S. Pat. No. 3,865,740); Combination of a hydroxyaliphatic carboxylic acid and a boric acid (e.g., U.S. Pat. No. 4,554,086); Combination of a hydroxyaliphatic carboxylic acid, then formaldehyde and a phenol (e.g., U.S. Pat. No. 4,636,322); Combination of a hydroxyaliphatic carboxylic acid and then an aliphatic dicarboxylic acid (e.g., U.S. Pat. No. 4,663,064); Combination of formaldehyde and a phenol and then glycolic acid (e.g., U.S. Pat. No. 4,699,724); Combination of a hydroxyaliphatic carboxylic acid or oxalic acid and then a diisocyanate (e.g. U.S. Pat. No. 4,713,191); Combination of inorganic acid or anhydride of phosphorus or a partial or total sulfur analog thereof and a boron compound (e.g., U.S. Pat. No. 4,857,214); Combination of an organic diacid then an unsaturated fatty acid and then a nitrosoaromatic amine optionally followed by a boron compound and then a glycolating agent (e.g., U.S. Pat. No. 4,973,412); Combination of an aldehyde and a triazole (e.g., U.S. Pat. No. 4,963,278); Combination of an aldehyde and a triazole then a boron compound (e.g., U.S. Pat. No. 4,981,492); Combination of cyclic lactone and a boron compound (e.g., U.S. Pat. Nos. 4,963,275 and 4,971,711). The above-mentioned patents are herein incorporated in their entireties.

The TBN of a suitable dispersant may be from about 10 to about 65 mg KOH/g dispersant, on an oil-free basis, which is comparable to about 5 to about 30 TBN if measured on a dispersant sample containing about 50% diluent oil. TBN is measured by the method of ASTM D2896.

In yet other embodiments, the optional dispersant additive may be a hydrocarbyl substituted succinamide or succinimide dispersant. In approaches, the hydrocarbyl substituted succinamide or succinimide dispersant may be derived from a hydrocarbyl substituted acylating agent reacted with a polyalkylene polyamine and wherein the hydrocarbyl substituent of the succinamide or the succinimide dispersant is a linear or branched hydrocarbyl group having a number average molecular weight of about 250 to about 5,000 as measured by GPC using polystyrene as a calibration reference.

In some approaches, the polyalkylene polyamine used to form the dispersant has the Formula

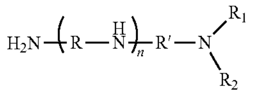

wherein each R and R', independently, is a divalent C1 to C6 alkylene linker, each R1 and R2, independently, is hydrogen, a C1 to C6 alkyl group, or together with the nitrogen atom to which they are attached form a 5- or 6-membered ring optionally fused with one or more aromatic or non-aromatic rings, and n is an integer from 0 to 8. In other approaches, the polyalkylene polyamine is selected from the group consisting of a mixture of polyethylene polyamines having an average of 5 to 7 nitrogen atoms, triethylenetetramine, tetraethylenepentamine, and combinations thereof.

The dispersant, if present, can be used in an amount sufficient to provide up to about 20 wt %, based upon the final weight of the lubricating oil composition. Another amount of the dispersant that can be used may be about 0.1 wt % to about 15 wt %, or about 0.1 wt % to about 10 wt %, about 0.1 to 8 wt %, or about 1 wt % to about 10 wt %, or about 1 wt % to about 8 wt %, or about 1 wt % to about 6 wt %, based upon the final weight of the lubricating oil composition. In some embodiments, the lubricating oil composition utilizes a mixed dispersant system. A single type or a mixture of two or more types of dispersants in any desired ratio may be used.

ANTIWEAR AGENTS: The lubricating oil compositions herein also may optionally contain one or more antiwear agents. Examples of suitable antiwear agents include, but are not limited to, a metal thiophosphate; a metal dialkyldithiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, dithiocarbamates, and/or bis(S-alkyldithiocarbamyl) disulfides; and mixtures thereof. A suitable antiwear agent may be a molybdenum dithiocarbamate, bis(dialkyl-dithiocarbamate), or alkylene bis(dialkyl-dithiocarbamate) and the like antiwear agents. The phosphorus containing antiwear agents are more fully described in European Patent 612 839. The metal in the dialkyl dithio phosphate salts may be an alkali metal, alkaline earth metal, aluminum, lead, tin, molybdenum, manganese, nickel, copper, titanium, or zinc. A useful antiwear agent may be zinc dialkyldithiophosphate.

Further examples of suitable antiwear agents include titanium compounds, tartrates, tartrimides, oil soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0 wt % to about 15 wt %, or about 0.01 wt % to about 10 wt %, or about 0.05 wt % to about 5 wt %, or about 0.1 wt % to about 3 wt % of the lubricating oil composition. In other embodiments, the compositions here may further include one or more oil-soluble molybdenum compounds, and if included, providing about 200 ppm or less of molybdenum, less than about 150 ppm, less than about 100 ppm, or less than about 50 ppm of molybdenum.

ANTIOXIDANTS: In some embodiments, the lubricating oil compositions herein may contain one or more antioxidants. Suitable antioxidants include phenolic antioxidants, aromatic amine antioxidants, sulfur containing antioxidants, and organic phosphites, among others.

Examples of phenolic antioxidants include 2,6-di-tert-butylphenol, liquid mixtures of tertiary butylated phenols, 2,6-di-tert-butyl-4-methylphenol, 4,4'-methylenebis(2,6-di-tert-butylphenol), 2,2'-methylenebis(4-methyl-6-ter-t-butylphenol), and mixed methylene-bridged polyalkyl phenols, and 4,4'-thiobis(2-methyl-6-tert-butylphenol), N,N'-di-sec-butyl-phenylenediamine, 4-iisopropylaminodiphenylamine, phenyl-alpha-naphthyl amine, phenyl-alpha-naphthyl amine, and ring-alkylated diphenylamines. Examples include the sterically hindered tertiary butylated phenols, bisphenols and cinnamic acid derivatives and combinations thereof.

Aromatic amine antioxidants include, but are not limited to diarylamines having the formula:

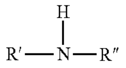

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is preferred that one or both aryl groups be substituted, e.g. mono-alkylated diphenylamine, di-alkylated diphenylamine, or mixtures of mono- and di-alkylated diphenylamines.

Examples of diarylamines that may be used include, but are not limited to: diphenylamine; various alkylated diphenylamines, 3-hydroxydiphenylamine, N-phenyl-1,2-phenylenediamine, N-phenyl-1,4-phenylenediamine, monobutyldiphenyl-amine, dibutyl diphenylamine, monooctyldiphenylamine, dioctyldiphenylamine, monononyl diphenylamine, dinonyldiphenylamine, monotetradecyldiphenylamine, ditetradecyl diphenylamine, phenyl-alpha-naphthylamine, monooctyl phenyl-alpha-naphthylamine, phenyl-beta-naphthylamine, monoheptyldiphenylamine, diheptyl-diphenylamine, p-oriented styrenated diphenylamine, mixed butyloctyldi-phenylamine, and mixed octylstyryldiphenylamine.

The sulfur containing antioxidants include, but are not limited to, sulfurized olefins that are characterized by the type of olefin used in their production and the final sulfur content of the antioxidant. High molecular weight olefins, i.e., those olefins having an average molecular weight of 168 to 351 g/mole, are preferred. Examples of olefins that may be used include alpha-olefins, isomerized alpha-olefins, branched olefins, cyclic olefins, and combinations of these.

Alpha-olefins include, but are not limited to, any $C_4$ to $C_{25}$ alpha-olefins. Alpha-olefins may be isomerized before the sulfurization reaction or during the sulfurization reaction. Structural and/or conformational isomers of the alpha olefin that contain internal double bonds and/or branching may also be used. For example, isobutylene is a branched olefin counterpart of the alpha-olefin 1-butene.

Sulfur sources that may be used in the sulfurization reaction of olefins include: elemental sulfur, sulfur monochloride, sulfur dichloride, sodium sulfide, sodium polysulfide, and mixtures of these added together or at different stages of the sulfurization process.

Unsaturated oils, because of their unsaturation, may also be sulfurized and used as an antioxidant. Examples of oils or fats that may be used include corn oil, canola oil, cottonseed oil, grapeseed oil, olive oil, palm oil, peanut oil, coconut oil, rapeseed oil, safflower seed oil, sesame seed oil, soybean oil, sunflower seed oil, tallow, and combinations of these.

The total amount of antioxidant in the lubricating oil composition described herein may be present in an amount to deliver up to about 200 ppm nitrogen, or up to about 150 ppm nitrogen, or about 100 to about 150 ppm nitrogen.

FRICTION MODIFIERS: In some embodiments, the lubricating oil compositions herein may also contain additional friction modifiers other than those contained in the friction modifier system described above. Suitable additional friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanidine, alkanolamides, phosphonates, metal-containing compounds, glycerol esters, sulfurized fatty compounds and olefins, sunflower oil other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and such hydrocarbyl groups may be saturated or unsaturated. The hydrocarbyl groups may be composed of carbon and hydrogen or hetero atoms such as sulfur or oxygen. The hydrocarbyl groups may range from 12 to 25 carbon atoms. In some embodiments the friction modifier may be a long chain fatty acid ester. In another embodiment the long chain fatty acid ester may be a mono-ester, or a di-ester, or a (tri)glyceride. The friction modifier may be a long chain fatty amide, a long chain fatty ester, a long chain fatty epoxide derivative, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685.

Aminic friction modifiers may include amines or polyamines. Such compounds can have hydrocarbyl groups that are linear, either saturated or unsaturated, or a mixture thereof and may contain from 12 to 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291.

If the additional friction modifiers contain nitrogen, such additional friction modifiers may be present in the lubricating oil composition in any amount as long as the performance requirements are not compromised.

CORROSION INHIBITORS: Other rust or corrosion inhibitors may also be included in the lubricating oil compositions described herein. Such materials include monocarboxylic acids and polycarboxylic acids. Examples of suitable monocarboxylic acids are octanoic acid, decanoic acid and dodecanoic acid. Suitable polycarboxylic acids include dimer and trimer acids such as are produced from such acids as tall oil fatty acids, oleic acid, linoleic acid, or the like.

Another useful type of rust inhibitor may be alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride, and the like. Also useful are the half esters of alkenyl succinic acids having 8 to 24 carbon atoms in the alkenyl group with alcohols such as the polyglycols. Other suitable rust or corrosion inhibitors include ether amines, acid phosphates, amines, polyethoxylated compounds such as ethoxylated amines, ethoxylated phenols, and ethoxylated alcohols, imidazolines, aminosuccinic acids or derivatives thereof, and the like. Mixtures of such rust or corrosion inhibitors may be used. The total amount of corrosion inhibitor, when present in the lubricating composition described herein may range up to 2.0 wt % or from 0.01 to 1.0 wt % based on the total weight of the lubricating composition.

VISCOSITY MODIFIERS: The lubricating oil composition may optionally contain one or more viscosity modifiers. Suitable viscosity modifiers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Viscosity modifiers may include star polymers and suitable examples are described in US Publication No. 2012/0101017 A1.

The lubricating oil compositions described herein also may optionally contain one or more dispersant viscosity modifiers in addition to a viscosity modifier or in lieu of a viscosity modifier. Suitable dispersant viscosity modifiers may include functionalized polyolefins, for example, ethylene-propylene copolymers that have been functionalized with the reaction product of an acylating agent (such as maleic anhydride) and an amine; polymethacrylates functionalized with an amine, or esterified maleic anhydride-styrene copolymers reacted with an amine.

The total amount of viscosity modifier and/or dispersant viscosity modifier, when present, may be up to about 1.0 wt %, or up to about 0.5 wt %, or up to about 0.3 wt % based on the total weight of the lubricating oil composition.

DEMULSIFIERS: Demulsifiers may also be included in the compositions herein and may include trialkyl phosphates, and various polymers and copolymers of ethylene glycol, ethylene oxide, propylene oxide, or mixtures thereof, including polyethylene oxides, polypropylene oxides and (ethylene oxide-propylene oxide) polymers. When present, the amount of demulsifier in the lubricating oil composition may be up about 0.05 wt, or up to about 0.02 wt %, or below about 0.015 wt % based on the total weight of the lubricating oil composition.

ANTIFOAM AGENTS: Antifoam agents used to reduce or prevent the formation of stable foam include silicones, polyacrylates, or organic polymers. Foam inhibitors that may be useful in the compositions of the disclosed invention include polysiloxanes, copolymers of ethyl acrylate and 2-ethylhexylacrylate and optionally vinyl acetate. When present, the amount of antifoam in the lubricating oil composition may be up about 0.1 wt, or up to about 0.05 wt %, or below about 0.04 wt % based on the total weight of the lubricating oil composition.

POUR POINT DEPRESSANTS: The lubricating oil compositions herein may optionally contain one or more pour point depressants. Suitable pour point depressants may include esters of maleic anhydride-styrene, polymethacrylates, polymethylmethacrylates, polyacrylates or polyacrylamides or mixtures thereof. Pour point depressants, when present, may be present in amount from about 0.001 wt % to about 0.04 wt %, based upon the total weight of the lubricant.

In general terms, a lubricating oil composition described herein may include additive components in the ranges listed in Table 2.

TABLE 2

| Component | Wt. % (Suitable Embodiments) | Wt. % (Preferred Embodiments) |
|---|---|---|
| Detergent Systems | 1.0-5.0 | 1.0-3.0 |
| Dispersant Systems | 2.0-15.0 | 4.0-10.0 |
| Antioxidant(s) | 1.0-5.0 | 1.0-3.0 |
| Ashless TBN booster(s) | 0.0-1.0 | 0.01-0.5 |
| Corrosion inhibitor(s) | 0.0-5.0 | 0.0 -2.0 |
| Metal dihydrocarbyldithiophosphate(s) | 0.0-6.0 | 0.5-2.0 |
| Ash-free phosphorus compound(s) | 0.0-6.0 | 0.0-4.0 |
| Antifoaming agent(s) | 0.0-1.0 | 0.001-0.15 |
| Other Antiwear agent(s) | 0.0-1.0 | 0.0-0.8 |
| Pour point depressant(s) | 0.0-1.0 | 0.00-0.5 |
| Viscosity index improver(s) | 0.0-15.0 | 1.0-10.0 |
| Friction modifier(s) | 0.00-1.0 | 0.01-0.8 |
| Base oil | Balance | Balance |
| Total | 100 | 100 |

The percentages of each component above represent the weight percent of each component, based upon the total weight of the lubricating oil composition containing the recited component. Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent). The use of an additive concentrate takes advantage of the mutual compatibility afforded by the combination of ingredients when in the form of an additive concentrate. Also, the use of a concentrate reduces blending time and lessens the possibility of blending errors.

Unless the context of discussion herein suggests otherwise, the following definitions of terms are provided in order to clarify the meanings of certain terms as used herein.

The terms "lubricating oil," "lubricant composition," "lubricating composition," "lubricant" and "lubricating oil composition" refer to a finished lubrication product comprising a major amount of a base oil plus a minor amount of an additive composition. As used herein, a major amount includes at least 50 weight percent or more and a minor amount includes less than 50 weight percent.

As used herein, the terms "additive package," "additive concentrate," and "additive composition," refer the portion of the lubricating oil composition excluding the major amount of base oil.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having a predominantly hydrocarbon character. Each hydrocarbyl group is independently selected from hydrocarbon substituents, and substituted hydrocarbon substituents containing one or more of halo groups, hydroxyl groups, alkoxy groups, mercapto groups, nitro groups, nitroso groups, amino groups, pyridyl groups, furyl groups, imidazolyl groups, oxygen and nitrogen, and wherein no more than two non-hydrocarbon substituents are present for every ten carbon atoms in the hydrocarbyl group.

As used herein, the term "percent by weight" or "wt %", unless expressly stated otherwise, means the percentage the recited component represents to the weight of the entire composition.

The terms "soluble," "oil-soluble," or "dispersible" used herein may, but does not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed. Moreover, the additional incorporation of other additives may also permit incorporation of higher levels of a particular additive, if desired.

The term "alkyl" as employed herein refers to straight, branched, cyclic, and/or substituted saturated chain moieties from about 1 to about 200 carbon atoms.

The term "alkenyl" as employed herein refers to straight, branched, cyclic, and/or substituted unsaturated chain moieties from about 3 to about 30 carbon atoms.

The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, and oxygen.

As used herein, the "average number molecular weight" or "Mn" is determined by gel permeation chromatography (GPC) using commercially available polystyrene standards (with a Mn of about 180 to about 18,000 as the calibration reference).

It is to be understood that throughout the present disclosure, the terms "comprises," "includes," "contains," etc. are considered open-ended and include any element, step, or ingredient not explicitly listed. The phrase "consists essentially of" is meant to include any expressly listed element, step, or ingredient and any additional elements, steps, or ingredients that do not materially affect the basic and novel aspects of the invention. The present disclosure also contemplates that any composition described using the terms, "comprises," "includes," "contains," is also to be interpreted as including a disclosure of the same composition "consisting essentially of" or "consisting of" the specifically listed components thereof.

EXAMPLES

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise or apparent from the context of discussion in the Example below and throughout this disclosure and claims, all percentages, ratios, and parts noted in this disclosure are by weight. Any standardized test method noted in the Examples, disclosure, or claims, unless apparent from the context of its use, refers to the version of the test method publicly available at the time of the filing of the present disclosure.

The Examples herein evaluated average stochastic pre-ignition (SPI) events at FEV Europe GmbH using a 7.7 liter medium duty 6-cylinder inline H2 engine (wherein the H2 fuel has an auto-ignition temperature of about 850K to 858K) having a peak cycle pressure of 160 bar mean and 180 bar max. The crank angle was adjusted to meet the target center of combustion so as not to promote or mitigate SPI. SPI was evaluated by measuring SPI counts in each cylinder at 12 bar mean effective pressure (BMEP) at 1000 rpm for a total of 150 measurements. Each measurement contained 500 cycles for each cylinder. Average SPI for the engine per 500 cycles was determined by calculating the average events over all 6 cylinders.

Table 3 below describes a first set of lubricants: Comparative lubricants 1-3 and Inventive lubricants 1-2. The lubricants contained the same base additive package containing the same amount and type of dispersants, antioxidants, antifoam agents, friction modifiers, and viscosity modifiers. Only the detergent system and the ZDDP antiwear additives were varied among the lubricants as shown in Table 3 below. Process oil in the base package varied slightly to account for treat rate changes in the detergent systems. The lubricants were blended in the same base oil blend of API Group II base oils and had a kV 100° C. of approximately 14 cSt.

Table 4 below describes an additional lubricant, Inventive 3. This lubricant included a different base additive package and included a variation of the inventive detergent system. This formulation was tested in API Group II base oil with treat rates thereof to obtain finished fluids having a kV100° C. of approximately 15 cSt.

The differences resulting from the changes in the detergent system (i.e., amounts of calcium and magnesium delivered to the lubricant), the TBN (ASTM D2896) of the lubricant, and the measured sulfated ash (ASTM D874) of the lubricants are detailed in Table 5. Detergents used in the lubricants of these Examples are as follows:

Detergent Additive 1 (Det-1): overbased calcium sulfonate detergent having a TBN of about 300 (as measured by ASTM D2896) and about 11.9 wt % calcium.

Detergent Additive 2 (Det-2): low-based to neutral calcium sulfonate detergent having a TBN of about 25 to about 50 (as measured by ASTM D2896) and about 2.7 wt % calcium.

Detergent Additive 3 (Det-3): overbased calcium phenate detergent having a TBN of about 250 (as measured by ASTM D2896) and about 9.25 wt % calcium.

Detergent Additive 4 (Det-4): overbased magnesium sulfonate detergent having a TBN of about 400 (as measured by ASTM D2896) and about 9.6 wt % magnesium.

TABLE 3

| Lubricant Formulations | | | | | | |
|---|---|---|---|---|---|---|
| | | Comp 1 | Comp 2 | Comp 3 | Inv 1 | Inv 2 |
| Det-1 | wt % | 1.4 | 3.4 | — | 2.5 | 2.5 |
| Det-2 | wt % | 0.2 | 0.2 | — | 0.2 | 0.2 |
| Det-3 | wt % | 0.8 | — | — | 1.1 | 1.1 |
| Det-4 | wt % | — | — | 1.78 | — | — |
| ZDDP | wt % | 1.1 | 1.1 | 1.1 | 1.1 | 0.54 |

TABLE 4

| Lubricant Formulation | | |
|---|---|---|
| | | Inv 3 |
| Det-2 | wt % | 0.05 |
| Det-3 | wt % | 1.3 |
| Det-4 | wt % | 0.741 |
| Dispersants | wt % | 7.5 |
| Additional Additives* | wt % | 4.14 |
| ZDDP Antiwear | wt % | 1.1 |
| Ashless Antiwear | wt % | 0.22 |
| Viscosity Modifiers | wt % | 7.6 |

*Additional Additives include antioxidants, antifoam, process oil, and pour point depressant.

TABLE 5

| Lubricant Properties | | | | | | |
|---|---|---|---|---|---|---|
| | Comp 1 | Comp 2 | Comp 3 | Inv 1 | Inv 2 | Inv 3 |
| mmol metal delivered to lubricant from overbased sulfonate detergent* | 4.11 | 9.95 | 7.03 | 7.44 | 7.44 | 3.04 |
| mmol metal delivered to lubricant from overbased phenate detergent | 1.89 | 0 | 0 | 2.53 | 2.53 | 3.10 |
| mmol metal delivered to lubricant from neutral/low base sulfonate detergent | 0.13 | 0.13 | 0 | 0.13 | 0.13 | 0.03 |
| Ratio of percent metal from overbased sulfonate detergent/TBN ** | 0.09 | 0.08 | 0.11 | 0.06 | 0.06 | 0.05 |
| Phosphorus, ppm | 892 | 892 | 892 | 892 | 892 | 778 |
| Molybdenum, ppm | 35 | 35 | 35 | 35 | 35 | 136 |
| TBN, mg KOH/g | 7.9 | 12 | 8.8 | 12 | 12 | 10 |
| SASH, wt % | 0.99 | 1.54 | 1.0 | 1.54 | 1.48 | 0.95 |

*Exemplary mmol calculation for Inv 3: 0.741 g of Det 4 x 9.6 wt % Mg = about 0.0711 g Mg/0.0234 g/mmol = mmol of metal delivered to lubricant from overbased sulfonate detergent of about 3.04 mmol Mg. Other metal amounts are determined in a similar fashion.

** Exemplary ratio calculation for Inv 3: (3.04 mmol of metal from overbased sulfonate detergent/(3.04 mmol + 3.10 mmol + 0.03 mmol))/TBN of 10 = ratio of about 0.05.

TABLE 6

| SPI Evaluations (Average SPI count, load sweep, 1000 rpm, 12 bar BMEP) | | | | | | |
|---|---|---|---|---|---|---|
| | Comp 1 | Comp 2 | Comp 3 | Inv 1 | Inv 2 | Inv 3 |
| Average SPI in $H_2$ ICE engine | 7.85 | 8.54 | 11.03 | 4.48 | 4.76 | 3.69 |
| Sequence IX Average LSPI in gasoline engine | 3.74 | 12.79 | 0.74 | 1.42 | 8.61 | 22.22 |
| Average SPI in $H_2$-ICE engine | Fail | Fail | Fail | PASS | PASS | PASS |
| Sequence IX Average LSPI in gasoline engine* | Pass | Fail | Pass | Pass | Fail | Fail |

*ASTM D8291 with each lubricant composition evaluated in a traditional gasoline-fueled engine.

As shown by Comparative lubricant Samples 1-3 in Tables 5 and 6 (and FIG. 1), if the metal delivered from overbased sulfonate detergent is not balanced correctly relative to the total detergent metal and/or the percent metal from overbased sulfonate detergent relative to the TBN (e.g., mmol metal amounts and/or comparative ratio above 0.07 as shown in Table 5 and FIG. 1), then the average SPI is unacceptably high (e.g., above 6) when the lubricant is used in a hydrogen-fueled internal combustion engine. However, as shown by Inventive Samples 1-3 of Tables 5 and 6 (and FIG. 1), when the metal delivered from the overbased sulfonate detergent is correctly balanced relative to the total detergent metal and/or the percent metal from overbased sulfonate detergent relative to the TBN (e.g., select mmol metal amounts and/or a ratio of 0.07 or below as shown in Table 5 and FIG. 1), then the average SPI events are minimized (e.g., 6 or less) when the lubricant is used in a hydrogen-fueled internal combustion engine. FIG. 1 also shows the improvement of SPI in the embodiments including the ratio of percent overbased sulfonate metal correctly balanced relative to the TBN as being suitable for alternative fueled engines and, in particular, hydrogen-fueled engines. The data of Table 6 also shows that lubricants passing Sequence IX for LSPI (ASTM D8291) in traditional gasoline engines do not necessarily achieve passing SPI in hydrogen-fueled internal combustion engines.

It is to be understood that while the lubricating composition and compositions of this disclosure have been described in conjunction with the detailed description thereof and summary herein, the foregoing description is intended to illustrate and not limit the scope of the disclosure, which is defined by the scope of the appended claims. Other aspects, advantages, and modifications are within the scope of the claims. It is intended that the specification and examples be considered as exemplary only, with a true scope of the disclosure being indicated by the following claims.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification are to be understood as being modified in all instances by the term "about," whether or not the term "about" is present. Accordingly, unless indicated to the contrary, the numerical parameters set forth in the specification are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, a range of from 1 to 4 is to be interpreted as an express disclosure of the values 1, 2, 3 and 4 as well as any range of such values such as 1 to 4, 1 to 3, 1 to 2, 2 to 4, 2 to 3 and so forth.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

What is claimed is:

1. A lubricating oil composition configured for lubricating an internal combustion engine fueled with a hydrogen fuel having an auto-ignition temperature greater than about 700K, the lubricating oil composition comprising:

one or more base oils of lubricating viscosity;

a detergent system including (i) at least one overbased metal-containing sulfonate detergent providing about 2 to about 8 mmol of metal to the composition;

(ii) at least one neutral to low-based metal containing sulfonate detergent providing about 0.02 mmol to about 0.2 mmol of metal to the composition;

(iii) at least one overbased metal-containing phenate detergent providing about 2 to about 4 mmol of metal to the composition;

wherein mmol of metal is relative to a 100 gram sample; and wherein the lubricating oil composition has a total base number (TBN), measured pursuant to ASTM D2896, of at least about 9.5.

2. The lubricating oil composition of claim 1, wherein a ratio of the proportion of moles of metal provided from the overbased metal-containing sulfonate detergent relative to the TBN of the lubricating oil composition (ASTM D2896) is about 0.07 or less.

3. The lubricating oil composition of claim 1, wherein the TBN of the lubricating oil composition is about 10 to about 15 as measured pursuant to ASTM D2896.

4. The lubricating oil composition of claim 1, wherein the lubricating oil composition has greater than 0.9 weight percent of sulfated ash (SASH) content as measured pursuant to ASTM D874.

5. The lubricating oil composition of claim 1, wherein the lubricating oil composition has greater than 1.2 weight percent of sulfated ash (SASH) content as measured pursuant to ASTM D874.

6. The lubricating oil composition of claim 1, wherein the detergent system provides about 1000 to about 5000 ppm of calcium.

7. The lubricating oil composition of claim 6, wherein the detergent system provides about 10 to about 800 ppm of magnesium.

8. The lubricating oil composition of claim 1, wherein the composition further includes one or more oil-soluble molybdenum compounds providing about 200 ppm or less of molybdenum.

9. The lubricating oil composition of claim 1, wherein the detergent system includes at least an overbased metal-containing sulfonate detergent and at least an overbased metal-containing phenate detergent, and wherein each overbased detergent has a TBN of at least about 200 (ASTM D2896).

10. The lubricating oil composition of claim 1, wherein the one or more base oils of lubricating viscosity include API Group I base oils, API Group II base oils, or combinations thereof.

11. The lubricating oil composition of claim 1, wherein the lubricating oil composition has an average measured stochastic pre-ignition (SPI) of about 6 SPI counts or less at 1000 rpm and 12 bar brake mean effective pressure (BMEP).

12. A method of lubricating an internal combustion engine when fueled with a hydrogen fuel having an auto-ignition temperature greater than about 700K to mitigate abnormal combustion events, the method comprising:

lubricating a crankcase of an internal combustion engine with a lubricating oil composition and combusting a hydrogen fuel having an auto-ignition temperature greater than about 700K in the internal combustion engine; and wherein the lubricating oil composition includes (i) one or more base oils of lubricating viscosity and (ii) a detergent system including (iia) at least one overbased metal-containing sulfonate detergent providing about 2 to about 8 mmol of metal to the composition; (iib) at least one neutral to low-based metal containing sulfonate detergent providing about 0.02 to about 0.2 mmol of metal to the composition; (iic) at least one overbased metal-containing phenate detergent providing about 2 to about 4 mmol of metal to the composition and wherein the mmol of metal is relative to a 100 gram sample; and wherein the lubricating oil composition has a total base number (TBN), measured pursuant to ASTM D2896, of at least about 9.5.

13. The method of claim 12, wherein a ratio of the percent proportion of moles of metal provided from the overbased metal-containing sulfonate detergent relative to the TBN of the lubricating oil composition (ASTM D2896) is about 0.07 or less.

14. The method of claim 13, wherein the TBN of the lubricating oil composition is about 10 to about 15 as measured pursuant to ASTM D2896.

15. The method of claim 12, wherein the lubricating oil composition provides has greater than 0.9 weight percent of sulfated ash (SASH) content as measured pursuant to ASTM D874.

16. The method of claim 15, wherein the lubricating oil composition provides has greater than 1.2 weight percent of sulfated ash (SASH) content as measured pursuant to ASTM D874.

17. The method of claim 12, wherein the detergent system provides about 1000 to about 5000 ppm of calcium.

18. The method of claim 17, wherein the detergent system provides about 10 to about 800 ppm of magnesium.

19. The method of claim 12, wherein the composition further includes one or more oil-soluble molybdenum compounds providing about 200 ppm or less of molybdenum.

20. The method of claim 12, wherein the detergent system includes at least an overbased metal-containing sulfonate detergent and at least an overbased metal-containing phenate detergent and wherein each overbased detergent has a TBN of at least about 200 (ASTM D2896).

21. The method of claim 12, wherein the one or more base oils of lubricating viscosity include API Group I base oils, API Group II base oils, or combinations thereof.

22. The method of claim 12, wherein the lubricating oil composition has an average measured stochastic pre-ignition (SPI) of about 6 SPI counts or less at 1000 rpm and 12 bar brake mean effective pressure (BMEP).

23. An internal combustion engine configured for combustion of hydrogen fuel, the internal combustion engine comprising:

an engine crankcase lubricated with a lubricating oil composition;

the lubricating oil composition includes (i) one or more base oils of lubricating viscosity and (ii) a detergent system including (iia) at least one overbased metal-containing sulfonate detergent providing about 2 to about 8 mmol of metal to the composition; (iib) at least one neutral to low-based metal containing sulfonate detergent providing about 0.02 to about 0.2 mmol of metal to the composition; (iic) at least one overbased metal-containing phenate detergent providing about 2 to about 4 mmol of metal to the composition and wherein mmol of metal is relative to a 100 gram sample; and wherein the lubricating oil composition has a total base number (TBN), measured pursuant to ASTM D2896, of at least about 9.5; and hydrogen fuel.

24. The internal combustion engine of claim 23, wherein a ratio of the proportion of moles of metal provided from the overbased metal-containing sulfonate detergent relative to the TBN of the lubricating oil composition (ASTM D2896) is about 0.07 or less.

25. The internal combustion engine of claim 23, wherein the TBN of the lubricating oil composition is about 10 to about 15 as measured pursuant to ASTM D2896.

26. The internal combustion engine of claim 23, wherein the lubricating oil composition has greater than 0.9 weight percent of sulfated ash (SASH) content as measured pursuant to ASTM D874.

27. The internal combustion engine of claim 26, wherein the lubricating oil composition has greater than 1.2 weight percent of sulfated ash (SASH) content as measured pursuant to ASTM D874.

28. The internal combustion engine of claim 23, wherein the detergent system provides about 1000 to about 5000 ppm of calcium.

29. The internal combustion engine of claim 28, wherein the detergent system provides about 10 to about 800 ppm of magnesium.

30. The internal combustion engine of claim 23, wherein the composition further includes one or more oil-soluble molybdenum compounds providing about 200 ppm or less of molybdenum.

31. The internal combustion engine of claim 23, wherein the detergent system includes at least an overbased metal-containing sulfonate detergent and at least an overbased metal-containing phenate detergent and wherein each overbased detergent has a TBN of at least about 200 (ASTM D2896).

32. The internal combustion engine of claim 23, wherein the one or more base oils of lubricating viscosity include API Group I base oils, API Group II base oils, or combinations thereof.

33. The internal combustion engine of claim 23, wherein the lubricating oil composition has an average measured stochastic pre-ignition (SPI) of about 6 SPI counts or less at 1000 rpm and 12 bar brake mean effective pressure (BMEP).

34. The lubricating oil composition of claim 1, wherein the composition includes only sulfonate and phenate detergents.

35. The method of claim 12, wherein the composition includes only sulfonate and phenate detergents.

36. The internal combustion engine of claim 23, wherein the composition includes only sulfonate and phenate detergents.

* * * * *